Figure 7:
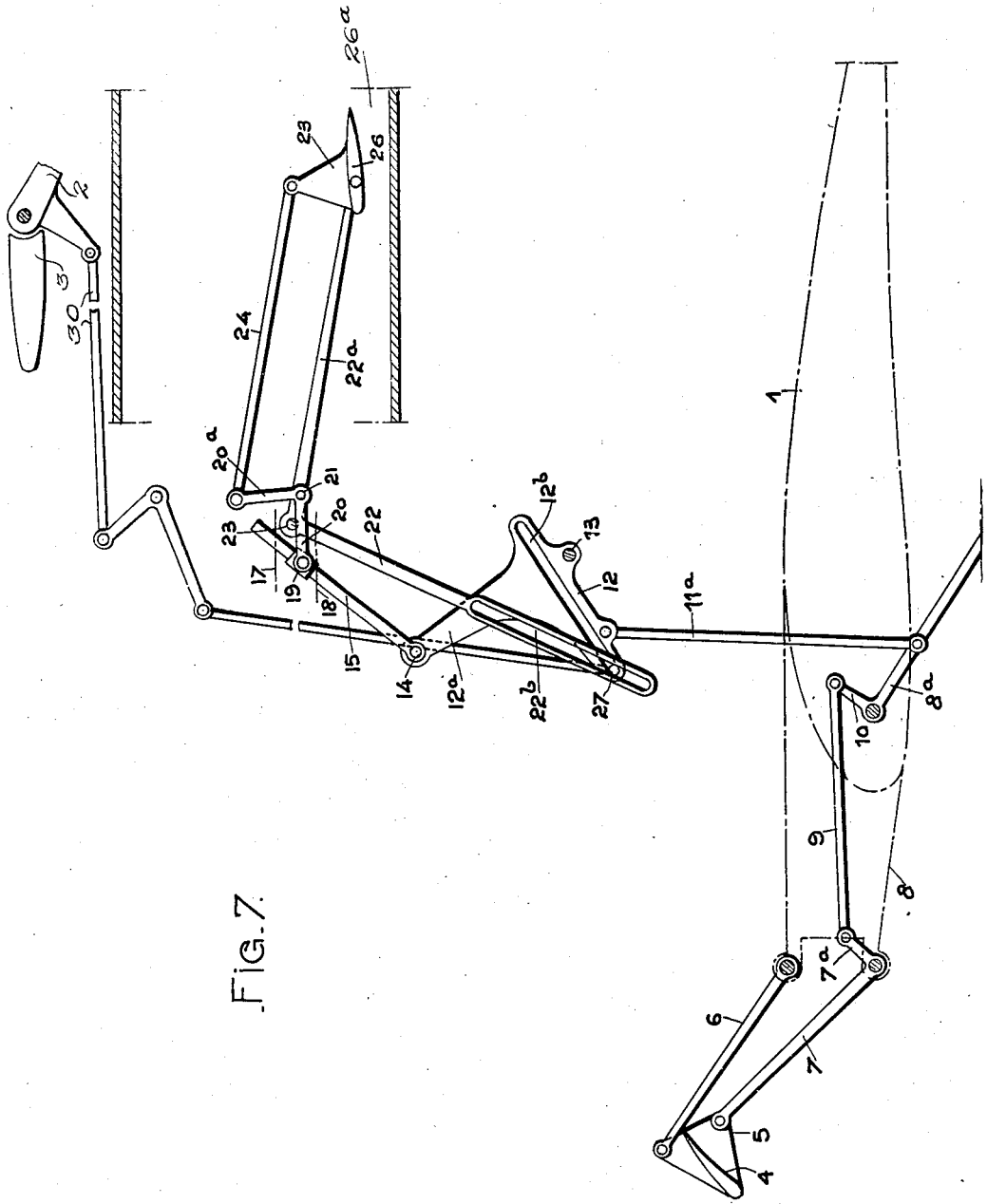

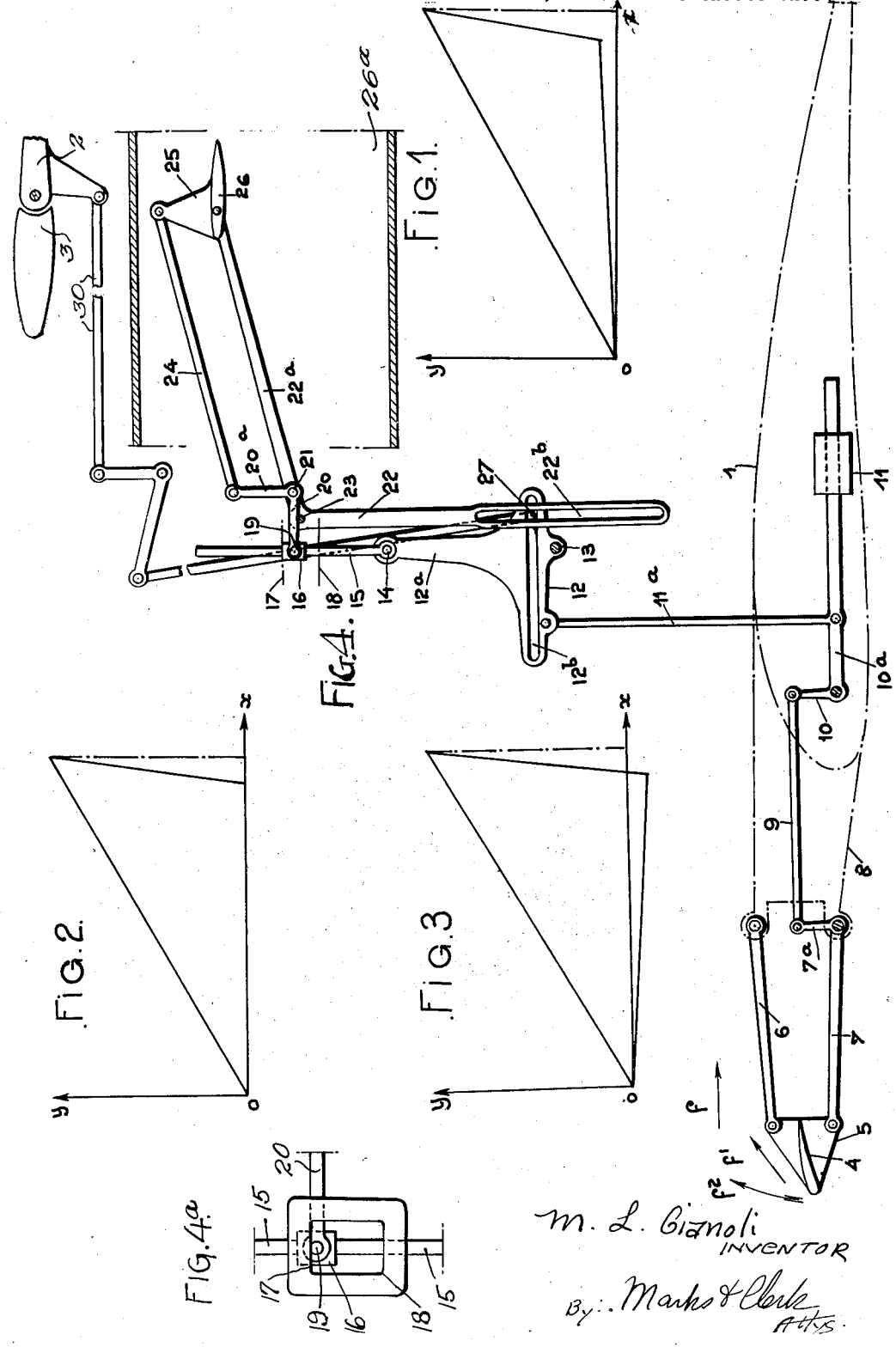

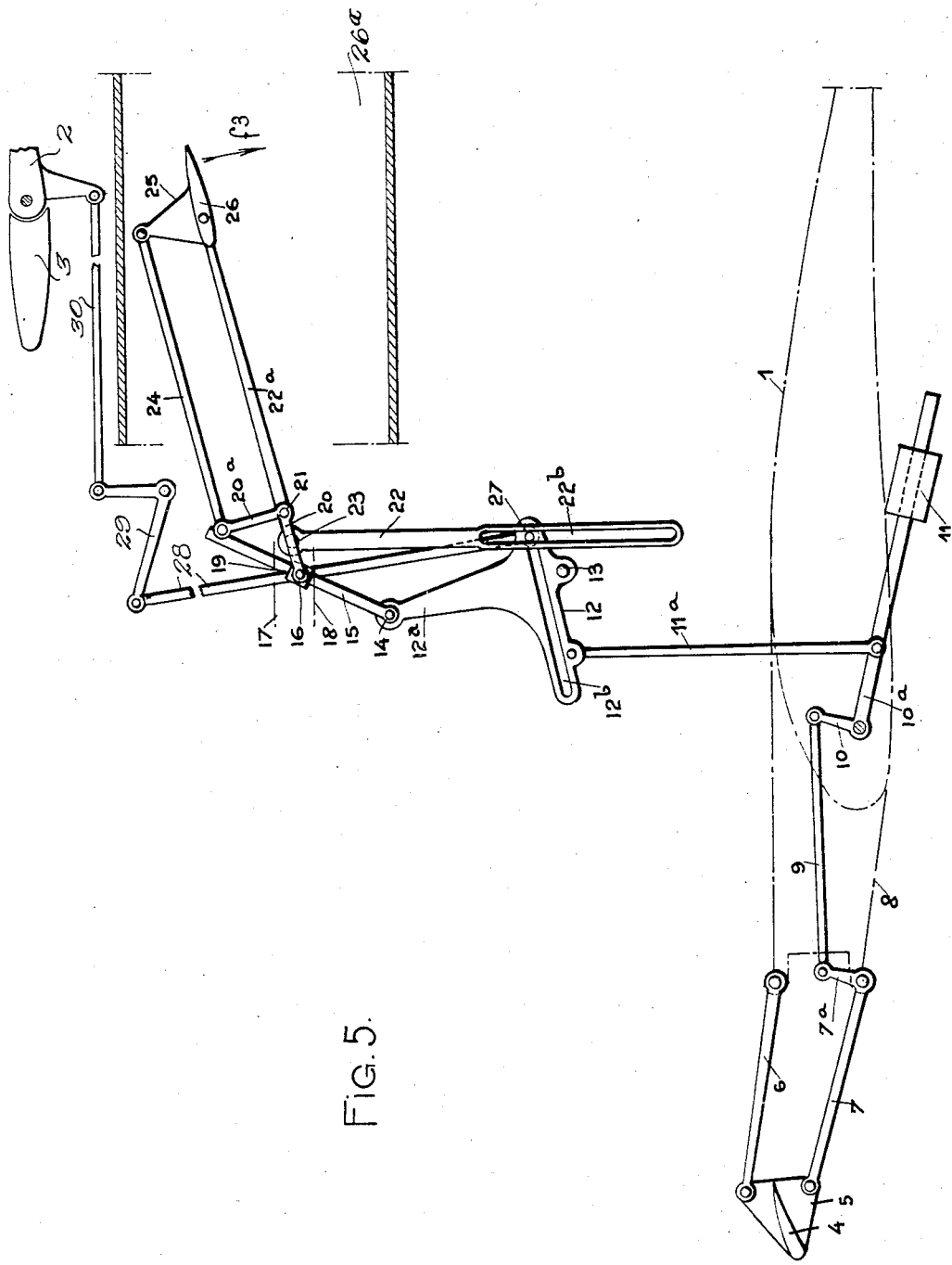

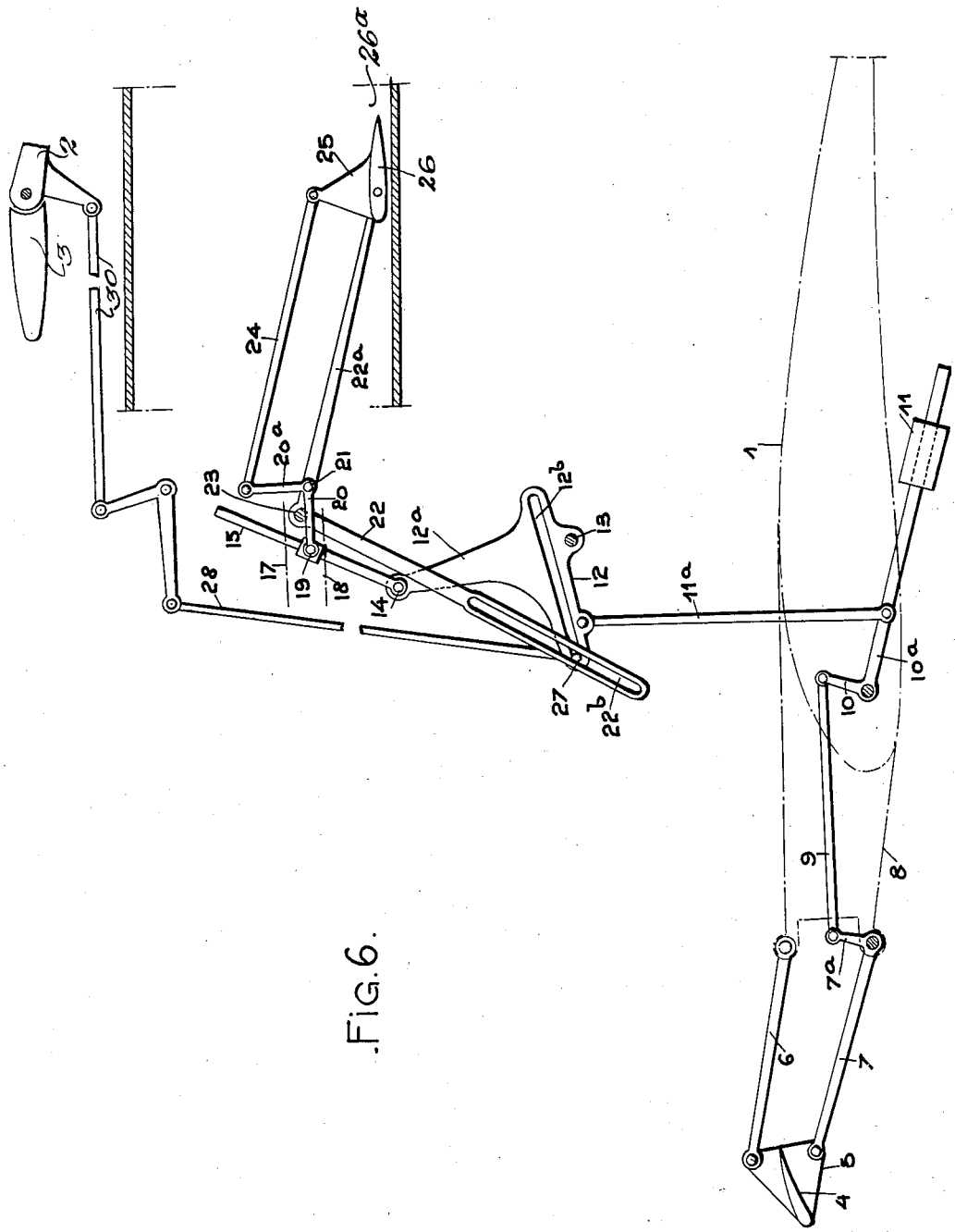

May 14, 1935.  M. L. GIANOLI  2,001,607
AUTOMATIC STABILIZER FOR VEHICLES
Filed Dec. 26, 1933   8 Sheets-Sheet 7
Fig.10.  Fig.11.  Fig.12.
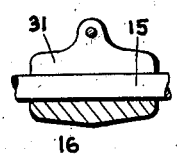
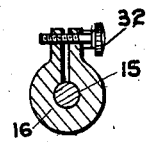
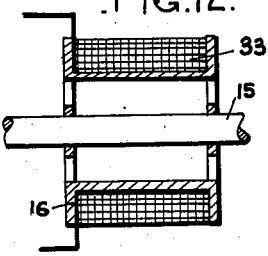
Fig.13.  Fig.14.
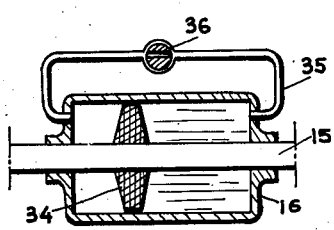
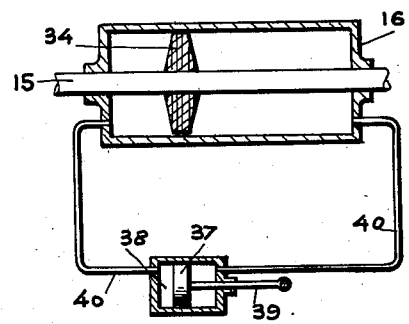
Fig.15.  Fig.16.
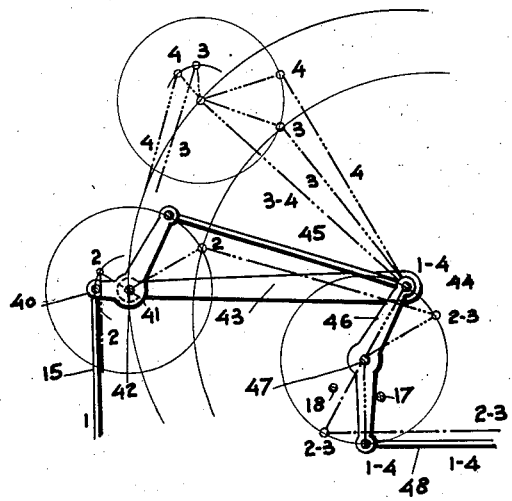
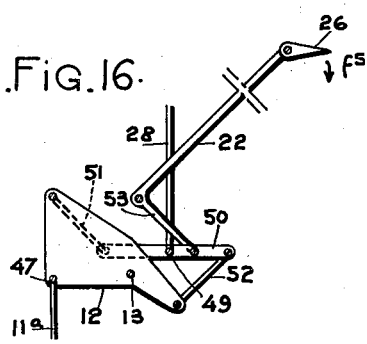
Fig.17.
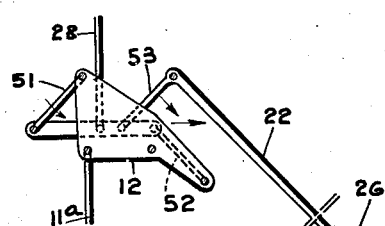

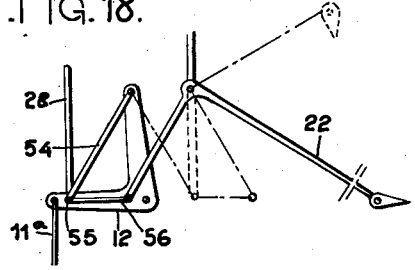
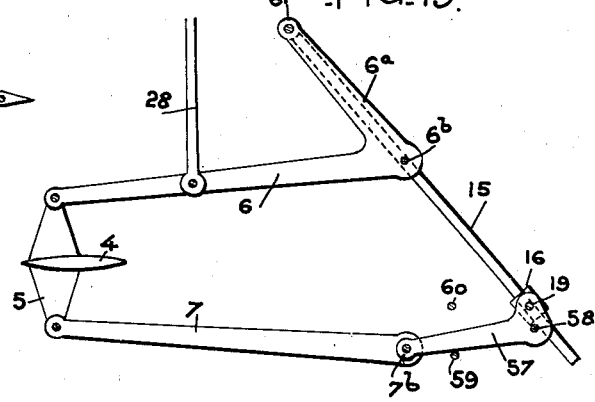
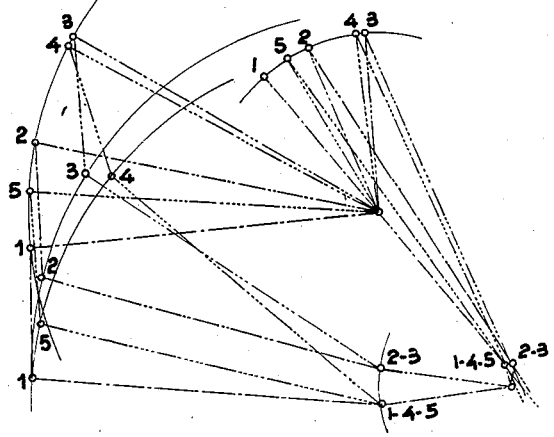
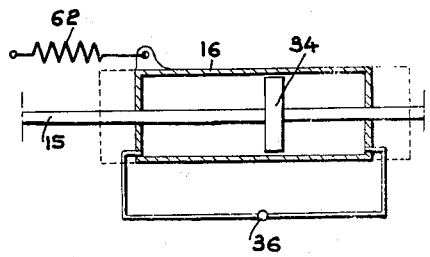
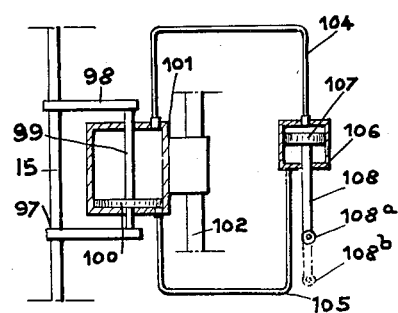

Patented May 14, 1935

2,001,607

UNITED STATES PATENT OFFICE 2,001,607

AUTOMATIC STABILIZER FOR VEHICLES

Marcel Louis Gianoli, Neuilly-sur-Seine, France

Application December 26, 1933, Serial No. 704,009
In Germany December 31, 1932

9 Claims. (Cl. 244—29)

This invention relates to stabilizers for vehicles, comprising an apparatus which detects the variations of at least one of the characteristics of the movement of the vehicle, and for instance the deviations in the course followed, and which acts on a control for resuming the previous course.

It has long been found that stabilizers of this type caused pendular oscillations of the vehicle, because, for instance, for one and the same deviation in the course followed, the position of the control was always the same, whatever may be the direction of the angular movement. If it is admitted that the positive sign represents the deviation when it tends to increase, and the negative sign when it tends to diminish, it can be said that the position of the control depended only on the magnitude of the deviation, and not in any way on its sign.

For avoiding the oscillations and for obtaining the rapid absorption of the same, it is necessary that the position of the control should be affected by the sign of the deviation, for instance, for one and the same angle of deviation, the angle of the control must be, for a negative deviation, materially smaller than for a positive deviation.

The solution of this technical problem gives rise to great difficulties, particularly for rapid movable objects moving in a medium of low viscosity, such as air.

The principle of certain solutions actually known consists in automatically actuating the control in such a manner that the latter, at the beginning of each angular movement and whatever may be its direction, moves more rapidly than at the end of said movement. Such a principle is practically difficult to carry out. In fact, if it is easily understood that the beginning of a movement can be detected and that the mechanical or like effects which are to follow the beginning of the movement can be subsequently produced, it is to be noted that it is difficult to mechanically foresee the end of this movement, for causing the operations which are to precede it to be automatically effected.

In certain prior apparatus of this type, the solution is in fact based on this hypothesis that the movements of deviation are always isochronous movements, which obviously is not in agreement with facts.

Solutions based on the hypothesis according to which a diminution of angular speed always presages the end of the movement have also been proposed. This hypothesis, although not rigorously exact, is nearer reality than the preceding one, but it leads to the use of complex and fragile apparatus.

Moreover, even if it is admitted that it is possible to construct an apparatus operating in all cases according to the above mentioned processes, this apparatus would not be capable of giving entire satisfaction when applied to a movable object moving at a high speed in a fluid of very low viscosity, such as air for instance, because the absorption obtained concerning the oscillations is not sufficient and that oscillations would always be produced.

The invention entirely departs from this principle of solution and is based on quite a different principle, which consists in restoring the control approximately to its mean position as soon as the deviation in the course followed tends to diminish, that is to say to become negative. During the periods of positive deviation, the control is actuated in the known manner by the apparatus detecting the deviations in the course followed, that is to say the setting angle of the control is proportional to the movement of this apparatus. At the moment the deviation tends to diminish, the control is, according to the invention, rapidly restored near its mean position. The return to the exact mean position (if it is not reached by the preceding operation, or if it is passed, as may be desirable in practice) takes place under the action of the apparatus detecting the deviations, as in the first phase, but with a very different factor of proportionality.

Figures 1 to 3 are graphs relating to the operation of apparatus according to the invention.

Figures 4 and 5 to 9 inclusive are side elevational views partly in section of one form of carrying the invention into practice as applied to an airplane, the several views respectively designating different positions assumed by the parts during flight.

Fig. 4a is an enlarged elevational detail of the abutments,

Fig. 10 is a sectional elevation on an enlarged scale of the friction assemblage, Fig. 11 is a corresponding sectional side view of the arrangement shown in Fig. 10, Fig. 12 is an enlarged sectional detail of the electromagnetic driving device, Fig. 13 is an enlarged section detail partly in elevation of a hydraulic driving device, Fig. 14 is a similar view of a slightly modified form of the arrangement shown in Fig. 13, Fig. 15 is a side elevational detail of a further modified form of the invention, Figs. 16 and 17 are side elevational views of a further modified form of the device used in lieu of the double slide, Fig. 18 is a side elevational view of a modified form of the arrangement shown in Figs. 16 and 17, Fig. 19 is a side elevational detail of a further modified form of the arrangement, Fig. 20 is a diagrammatic view showing the different positions respectively assumed by the parts shown in Fig. 19 during operation, Fig. 21 is a sectional detail partly in elevation for use in connection with the arrangement shown in Fig. 13 to allow the system to operate only when the speed of deviation is relatively high, and Fig. 22 is a sectional detail partly in elevation of a modified form of the arrangement shown in Fig. 21.

In Figs. 1 to 3, on the axis $Ox$ are traced the angles of deviation in the course followed by the vehicle, and on the axis $Oy$ the corresponding setting angles of the control.

The straight line $Oa$ represents the variations of the setting angle of the control in function of the angle of deviation, during the time the movable object departs from its normal course. At point $a$, the movable object tends to return to its normal position. The character of the invention then consists in the fact that the control is immediately restored to point $b$ near its mean position. In Fig. 1, the control does not quite return to this position, in Fig. 2, it reaches it, in Fig. 3, it slightly passes it. These three cases are included in the scope of the invention.

Figures 4 to 9 relate to a form of carrying the invention into practice, as applied to an airplane in which the deviation in the course followed, in the vertical plane, are detected by a wind vane acting on the elevator.

This arrangement is adapted to ensure that the airplane should always be placed at a definite incidence relatively to the relative wind.

The wing of the airplane is indicated at 1, and the elevator at 2, behind the fixed plane 3 to which it is hinged. The wind vane is constituted by a surface 4 secured to one of the sides 5 of a four-bar motion having two links 6—7 mounted on a frame 8 secured to the wing. The link 7 actuates, through its portion 7ᵃ bent at right angles, a link 9 actuating in its turn, a bent lever 10 provided with a counterweight 11. These arrangements do not form a part of the invention, but the lever 10 actuates the elevator 2 through a connection which constitutes the device forming the subject-matter of the invention.

The arm 10ᵃ of the lever 10 is connected, by a link 11ᵃ, to a frame 12 rotating about a shaft 13. This frame is provided with an arm 12ᵃ to the end of which is pivoted, at 14, a rod 15 on which a slide-block 16 is frictionally fitted, so that the rod 15 drives said slide-block 16. However, the movement of the latter is limited by abutments diagrammatically shown at 17 and 18 in Figures 4, 5, 6, 7, 8 and 9 but in detail in Fig. 4a. In this last figure, the abutments 17 and 18 are the end faces of an elongated opening 18ᵃ formed in a fixed frame 18ᵇ. The slide-block 16 bears against one or the other of these abutments through the end of a pivot 19 secured to the said slide-block.

The slide-block 16 is connected, by its pivot 19, to a bent lever 20 pivoted at 21 on the arm 22ᵃ of another bent lever 22, which, in its turn, is pivoted at 23. The arm 20ᵃ of the lever 20 and the arm 22ᵃ of the lever 22 form two sides of a four-bar motion 20ᵃ—22ᵃ—24—25, the side 25 of which opposed to 22ᵃ is provided with a surface 26 normally set in the relative wind, which, at this place, is maintained constant in direction, for instance by means of a guide tunnel 26ᵃ.

The frame 12 is provided with a groove 12ᵇ, and the lever 22 with another groove 22ᵇ, and through both these grooves simultaneously passes the stud 27 of a link 28 pivotally connected to a bent lever 29 which, through the medium of a link 30, actuates the elevator 2.

Normally, the parts are in the position shown in Fig. 4, in which the pivots 13—14—19 are arranged according to a straight line. The relative wind has the direction $f$.

Assuming the direction of the wind becomes $f^1$, the wind vane 4 tends to rotate in the direction of the arrow $f^2$ and the device first assumes the position shown in Fig. 5, after a small displacement of the wind vane.

The frame 12 has rotated, by driving the rod 15 which has actuated the slide-block 16. The latter, which was in contact with the abutment 17, has come in contact with the abutment 18, thereby causing the lever 20 and, consequently, the side 25 of the four-bar motion 20ᵃ—24—25—22ᵃ to rock. The surface 26 is obliquely set relatively to the relative wind, which, as stated, is maintained at this place constant in direction and parallel to $f$, by means for instance of a guide tunnel. The wind will therefore tend to cause the four-bar motion to rotate in the direction of the arrow $f^3$ in order to reach the position shown in Fig. 6.

Owing to the fact that the pivot 21 does not coincide with the pivot 23, the obliquity of the surface 26 diminishes during the rotation, and this surface again becomes parallel to the relative wind having a constant direction (Fig. 6). Moreover, the arm 22 which has rotated, moves the stud 27 to the end of the groove 12ᵇ (Fig. 6). From this moment, everything approximately takes place as if the lever 10ᵃ was directly connected to the lever 29, that is to say the control 22 is driven by the movements of the wind vane 4. The latter, by continuing to rotate in the direction of the arrow $f^2$ moves the entire device to the position shown in Fig. 7. It will be seen that, in this manner, the airplane tends to swoop down towards the ground, that is to say to set itself on the relative wind $f^1$ with the same incidence as at the beginning relatively to the relative wind $f$.

Figure 8:
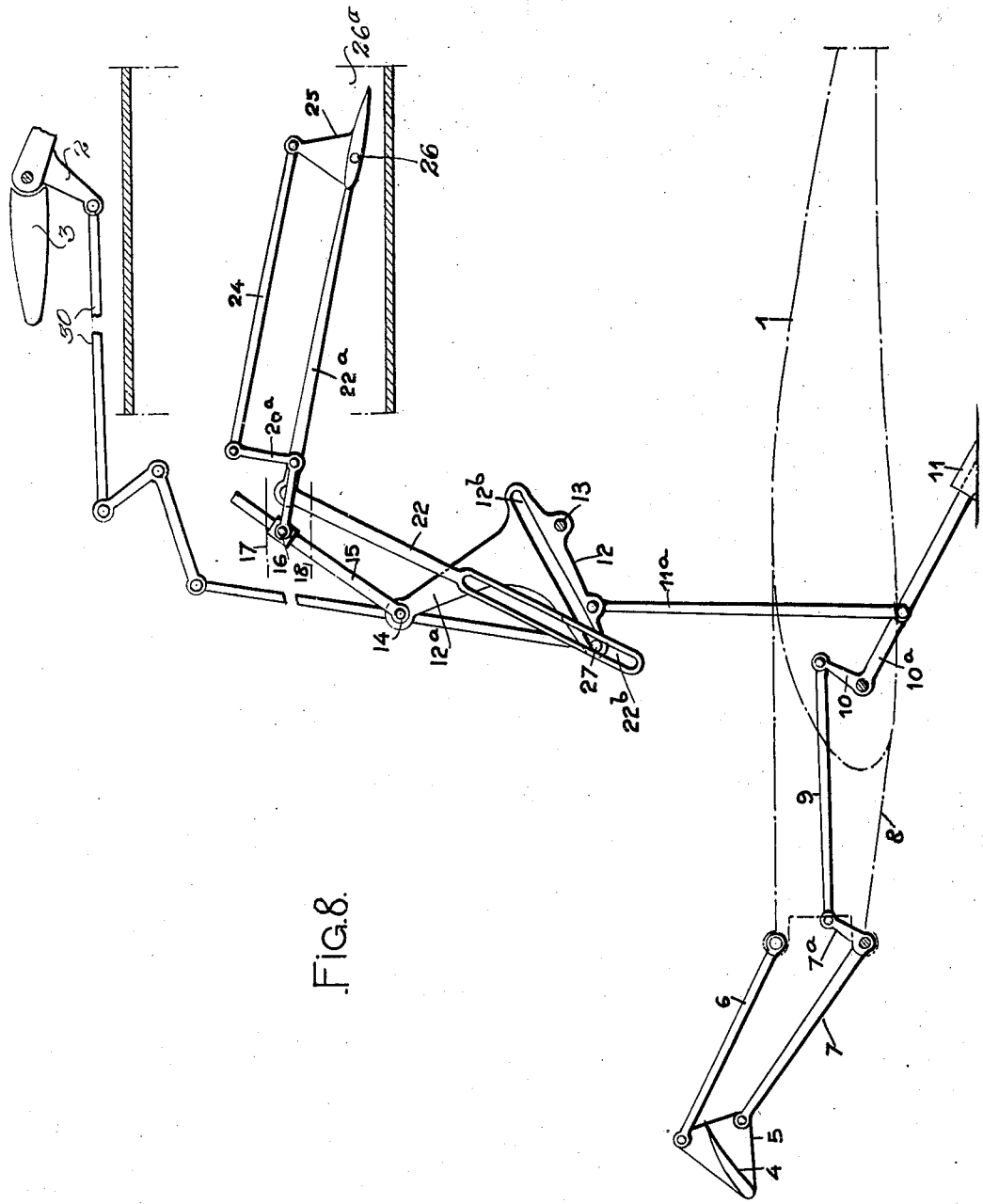
Figure 9:
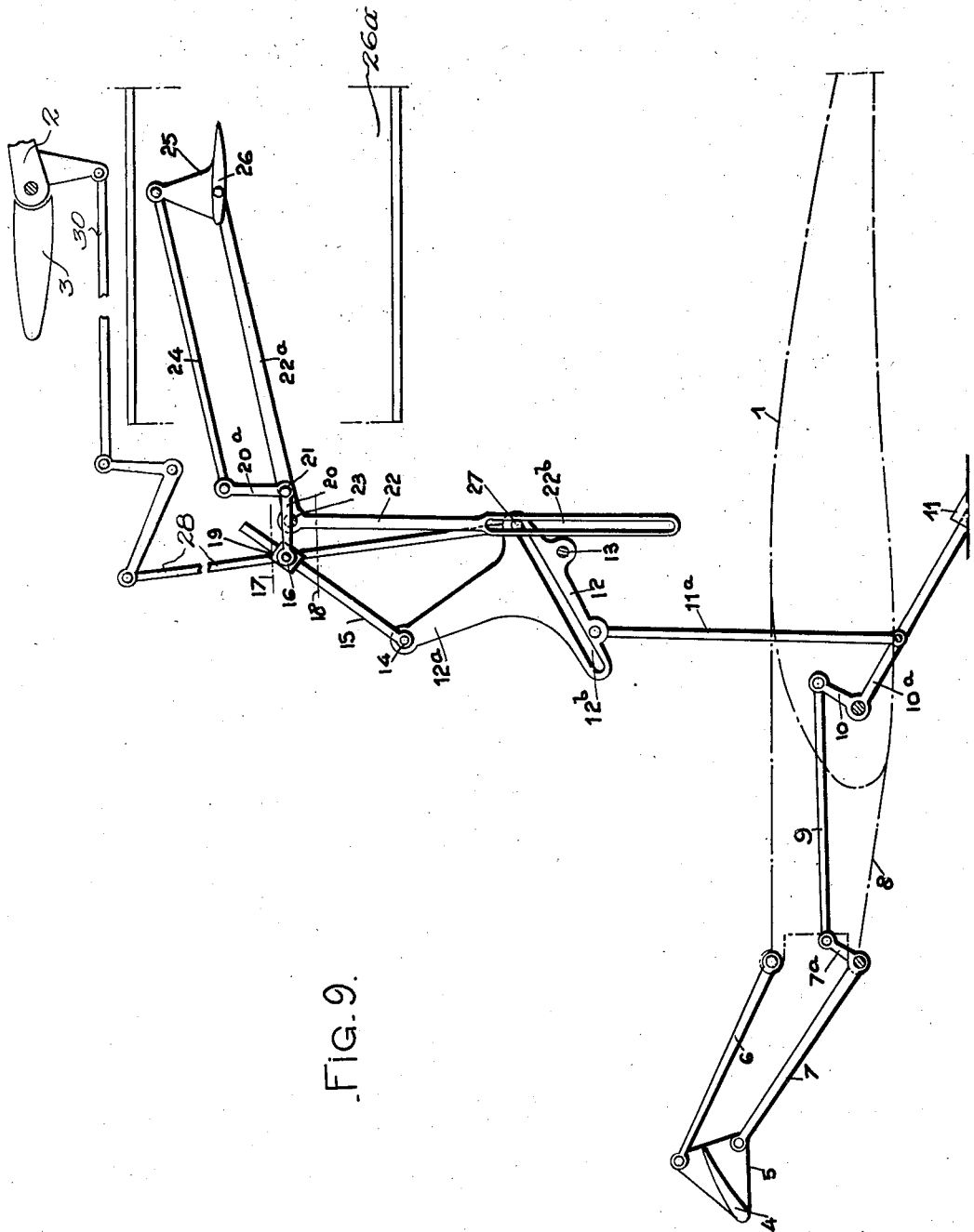

By thus swooping down towards the ground, the deviation relatively to the relative wind diminishes; consequently, the wind vane tends to rotate in reverse direction to $f^2$ (Fig. 8). At this moment, the frame 12 tends to return to its initial position, and the rod 15 moves the slide-block 16 up to the abutment 17. The lever 20 rocks and obliquely sets the surface 26 (Fig. 9). The action of the relative wind on this surface causes the four-bar motion to rotate in reverse direction to $f^3$ (Fig. 9), and the rotation of the arm 22 moves the finger 27 to the first end of the groove 12ᵇ. This movement has for effect to immediately restore the control near its initial position (Fig. 9), either slightly in front of, or slightly behind, or exactly at this position, according to the adjustment, which is effected according to the qualities of self-stability of the airplane.

The final return to normal position (Fig. 4)

takes place under the action of the wind vane 4.

It will be seen that the operation of the device according to the invention is independent from the initial direction of rotation of the arm 12. In all cases, as soon as the wind vane 4 moves from its normal position, the slide-block 16 moves away from the abutment 17 and comes in contact with the abutment 18. On the contrary, as soon as the wind vane 4 tends to return towards its normal position, the slide-block 16 moves away from the abutment 18 and comes in contact with the abutment 17. The first movement is used for increasing the gearing down ratio between the movement of the arm 10a and that of the lever 29; the second movement is used for considerably reducing this ratio, and even for rendering it null or reversing it (as is the case in the example illustrated).

The connection between the rod 15 and the slide-block 16 is such that the slide-block is normally actuated by the rod 15, but the latter can move relatively to the slide-block when the same is stopped by the abutments 17 or 18.

For that purpose, the friction assemblage shown in Figs. 10 and 11 can be used, Fig. 10 being a sectional elevation on an enlarged scale, and Fig. 11 a corresponding sectional side view. In this example, the slide-block 16 is blotted at 31 so as to be resilient, and a screw 32 allows to adjust the clamping action on the rod 15.

Fig. 12 illustrates an electromagnetic driving device; the metal rod 15 slides in a winding 33, through which passes alternating current for instance, and mounted on the slide-block 16. The currents induced in the rod 15 by the magnetic field tend to drive the winding 33 and the slide-block 16 in the same direction as the rod 15. The adjustment of the period or of the intensity of the alternating current allows to modify the driving stress.

Fig. 13 illustrates a form of construction of a hydraulic driving device.

In this device, the rod 15 slides, in a fluid-tight manner, in a cylinder 16 filled with a suitable fluid and drives a piston 34. A conduit 35, controlled by a cock 36 allowing to modify the section of the passageway through this conduit, puts both ends of the cylinder in communication. The cock 36 thus allows to modify the value of the stress driving, the cylinder 16 in translation.

Fig. 14 shows a constructional modification in which the rod 15 passes, in a fluid-tight manner, through a cylinder 16, a piston 34 being mounted on this rod 15 within the cylinder 16. A cylinder 37, carrying a rod 39, is connected at its ends, by conduits 40, to the ends of the cylinder 16 which is fixed.

The displacements of the fluid, under the action of the piston 34 driven by the rod 15, determine the movement of the piston 38 and, consequently, of the rod 39 which actuates the arm 20 (Fig. 4) through a linkwork. The perforations, provided in the piston 38, allow the flow of the fluid by exerting a certain checking action thereon, even when the piston 38 is stopped at one of the ends of the cylinder 37.

The use of a friction connection (mechanical, hydraulic or electromagnetic connection) can also be avoided by employing a device of the type shown in Fig. 15.

In this example, the rod 15 is pivoted at 40 to a lever 41 pivoted at 42 to another lever 43 capable of rocking about a fixed point 44. A link 45 connects the lever 41 to a third lever 46 pivoted at 47 and connected, by a link 48, to the lever 20a. The lever 46 is movable between two abutments 17 and 18.

The operation is as follows:

When the rod 15 moves upwardly, it tends to cause the lever 41 to rotate about the pivot 42, as the lever 43 is mounted with some friction on the pivot 44. The parts thus reach the position indicated by reference numbers 2 and in broken and double dotted lines. The movement of 15 continues, but the lever 46 is held stationary by the abutment 18, so that the lever 43 rocks to the position indicated by reference numbers 3 and in broken and triple dotted lines. When the rod 15 moves down again, it first causes the lever 41 and the lever 46 to rotate to the position indicated by reference numbers 4 and in broken and quadruple dotted lines. Then, the movement of the rod 15 restores the entire device to its initial position.

Use can also be made of any mechanism allowing two different movements, but one of them is limited by abutments, whilst the other is not limited but necessitates a greater effort than the first one.

The use of the double slide 12b—22b for guiding the end 27 of the rod 28 can also be avoided, by employing a device of the type shown in Figs. 16 and 17, or in Fig. 18.

In the example illustrated in Figs. 16 and 17, the link 11a actuated by the stabilizer, is pivoted at 47 to a lever or crank 12 pivoted at 13. The link 28, actuating the control, is pivoted at 49 to a member 50 connected, by links 51 and 52, to the lever 12. The member 53 is urged, in the direction of the arrow $f^5$, by a servo-motor 22—26 similar to that shown in Fig. 5. Under the action of this servo-motor, the various parts can move to the position shown in Fig. 18, in which the direction of displacement of the control is reversed.

Fig. 19 illustrates a modification in which the lever 12 is a bell crank lever, the link 28 actuating the control being connected to the lever 12 by a link 54, and the bell crank lever 22 being connected to the joint 55 by a link 56. This latter device can occupy the position shown in dot and dash lines, in which the direction of displacement of the control is reversed.

In some cases, the device according to the invention can be caused to act no longer on the linkwork arranged between the stabilizer and the control, but on the stabilizer itself, as in the example of Figs. 19 and 20.

In this example, the pivot 7b of the arm 7 of the stabilizer is not fixed, but on the contrary placed at the end of a lever 57, pivoted at 58 and mounted between two abutments 59 and 60. The rod 15 is pivoted at 61 to the end of the arm 6a and the slide-block 16 is pivoted at 19 to the lever 57. In the normal position, illustrated in Fig. 20, the pivots 61, 6b and 19 are arranged according to a straight line.

Assuming the stabilizer moves upwardly for instance, the members reach the position indicated by the reference numbers 2 and in double dotted lines in Fig. 20. The pivot 7b has moved towards 6b, so that a very great angular displacement is necessary (up to the position 3) in order that the surface 4 should be suitably set relatively to the relative wind. But, as soon as the movement is reversed, the members move to the position 4 and this considerably inclines the surface 4 which immediately returns very near its initial position (position 5) according to the essential feature of the invention.

The device shown in Fig. 21 which utilizes the means described with reference to Fig. 13, allows the system described to operate only when the speed of deviation is relatively high, and, in this case, it also allows the control to return to its normal position, or near the latter, as soon as this speed lowers below a predetermined value.

For that purpose, the cylinder 16 is simply restored by a spring 62. In these conditions, for a slow movement of the rod 15, the cylinder 16 is not driven, as the friction exerted by the liquid when it passes through the throttled portion 36 is not sufficient. If the speed is higher, the cylinder is actuated, but, as soon as this speed diminishes, the spring 62 restores the cylinder to its initial position. Consequently, this arrangement causes speed to intervene at the same time as the direction of the movement.

Another device is illustrated in Fig. 22 and utilizes the same principle which consists in successively moving two different members from the rod 15. In this figure, the member 15 carries two abutments 97 and 98 between which is locked a rod 99 carrying a piston 100 sliding in a cylinder 101. This cylinder follows the movement of 15 by moving along a slide 102. When the member 15 moves up or down, it first actuates the piston 100, which, when it is in contact with the abutment, drives the cylinder 101. This cylinder 101 is connected, by means of flexible conduits 104 and 105, to a cylinder 106 in which can move a piston 107, the end of the rod 108 of which can occupy the positions 108ᵃ and 108, according to the movement of the piston 100 in the cylinder 101.

What I claim as my invention and desire to secure by Letters Patent is:

1. In an automatic stabilizing apparatus, a detecting device for indicating the variations of one at least of the characteristics of the movement of the vehicle, a control, connecting means between the detector and the control for causing the detector to set the control in the direction counteracting the detected variation, means for automatically restoring the control in proximity to its position of rest as soon as the detected variation tends to diminish.

2. In an automatic stabilizing apparatus, a detector arranged for indicating the variations of one at least of the characteristics of the movement of the vehicle, a control, connecting means between the detector and the control for causing said detector to set the control in the direction counteracting the detected variation, means for indicating the sign of the movements of the detector, this sign being a positive sign when said detector moves away from its normal position, and being a negative sign when it moves towards said normal position, means for automatically restoring the control in proximity to its position of rest as soon as the movement of the detector becomes negative.

3. In an automatic stabilizing apparatus, a detector arranged for indicating the variations of one at least of the characteristics of the movement of the vehicle, a control, connecting means between the detector and the control for causing said detector to set the control in the direction counteracting the detected variation, said means comprising a transmission device having a variable gearing up ratio, means for indicating the sign of the movements of the detector, this sign being a positive sign when said detector moves away from its normal position and being a negative sign when it moves towards said normal position, means for automatically restoring the control in proximity to its position of rest as soon as the movement of the detector becomes negative, and for modifying the gearing up ratio of the transmission device in order that the control should exactly return to its position of rest under the control of the detector when the latter returns itself to its position of rest.

4. In a device for detecting the sign of the movements of a rocking member, this sign being positive when said member moves away from its normal position, and being negative when it moves towards said normal position, a rod connected by a pivot to the rocking member, and adapted to be, in the normal position of said rocking member, exactly in alignment with the straight line passing through the center of said pivot and the center of the pivot of the rocking member, a slide-block mounted on said rod, means for producing, between the rod and the slide-block, a limited stress which normally retains the slide-block on the rod at the same place, means for guiding the slide-block, and fixed abutments for limiting its movement.

5. In a device for detecting the sign of the movements of a rocking member, this sign being positive when said member moves away from its normal position, and being negative when it moves towards said normal position, a rod connected by a pivot to the rocking member, and adapted to be, in the normal position of said rocking member, exactly in alignment with the straight line passing through the center of said pivot and the center of the pivot of the rocking member, a slide-block mounted on said rod, means for producing a mechanical friction between the slide-block and the rod, means for guiding the slide-block, and fixed abutments for limiting its movement.

6. In a device for detecting the sign of the movements of a rocking member, this sign being positive when said member moves away from its normal position, and being negative when it moves towards said normal position, a rod connected by a pivot to the rocking member, and adapted to be, in the normal position of said rocking member, exactly in alignment with the straight line passing through the center of said pivot and the center of the pivot of the rocking member, a slide-block mounted on said rod, means for producing a magnetic coupling action between the slide-block and the rod, means for guiding the slide-block, and fixed abutments for limiting its movement.

7. In a device for detecting the sign of the movements of a rocking member, this sign being positive when said member moves away from its normal position, and being negative when it moves towards said normal position, a rod connected by a pivot to the rocking member, and adapted to be, in the normal position of said rocking member, exactly in alignment with the straight line passing through the center of said pivot and the center of the pivot of the rocking member, a slide-block mounted on said rod, a piston secured on said rod and sliding within a cylinder provided on the slide-block, connecting means between both portions separated in said cylinder by said piston, means for guiding the slide-block, and fixed abutments for limiting its movement.

8. In a device for detecting the sign of the movements of a rocking member, this sign being positive when said member moves away from its normal position, and being negative when it moves towards said normal position, a rod connected by a pivot to the rocking member, and adapted to be, in the normal position of said rocking member, exactly in alignment with the straight line passing through the center of said pivot and the center of the pivot of the rocking member, a piston secured on said rod, a cylinder within which slides said piston which divides the cylinder into two chambers, a second fixed cylinder, a second piston movable within the second cylinder and dividing it into two chambers, and connecting means between the corresponding chambers of the cylinders.

9. In a device for detecting the sign of the movements of a rocking member, this sign being positive when said member moves away from its normal position, and being negative when it moves towards said normal position, a rod connected by a pivot to the rocking member, and adapted to be, in the normal position of said rocking member, exactly in alignment with the straight line passing through the center of said pivot and the center of the pivot of the rocking member, a slide-block mounted on said rod, a piston secured on said rod and sliding within a cylinder provided on the slide-block, connecting means between both portions separated in said cylinder by said piston, means for guiding the slide-block, and fixed abutments for limiting its movement, resilient means arranged for checking the movement of the slide-block.

MARCEL LOUIS GIANOLI.